United States Patent [19]

Nilsson

[11] 4,134,307
[45] Jan. 16, 1979

[54] MEANS FOR MECHANICAL TRANSMISSION

[75] Inventor: Bengt Nilsson, Vasteras, Sweden

[73] Assignee: ASEA, Vasteras, Sweden

[21] Appl. No.: 789,835

[22] Filed: Apr. 22, 1977

Related U.S. Application Data

[63] Continuation of Ser. No. 467,676, May 4, 1974, abandoned.

[30] Foreign Application Priority Data

May 25, 1973 [SE] Sweden ................................ 7307367

[51] Int. Cl.² .......................................... F16H 21/14
[52] U.S. Cl. .................................................... 74/66
[58] Field of Search ..................................... 74/66, 67

[56] References Cited

U.S. PATENT DOCUMENTS

| 168,575 | 10/1875 | McGoskey | 74/67 |
| 2,368,813 | 2/1945 | Everitt | 74/66 |

Primary Examiner—Benjamin W. Wyche
Assistant Examiner—Wesley S. Ratliff, Jr.
Attorney, Agent, or Firm—Watson, Cole, Grindle & Watson

[57] ABSTRACT

For connecting one shaft to another, there are discs arranged on each of the shafts. A pair of elements project from each of the discs, being spaced from the axis thereof and angularly spaced around the axis. The elements project different distances from the discs in a direction parallel to the axes. The elements are connected by parallel rods which are articulated at their ends to the elements.

11 Claims, 5 Drawing Figures

MEANS FOR MECHANICAL TRANSMISSION

This is a continuation of application Ser. No. 467,676 filed May 4, 1974 now abandoned.

BACKGROUND OF THE INVENTION

1. Field of the Invention

The present invention relates to a means for mechanical transmission of power.

2. The Prior Art

For transmitting a torque from, for example, a driving wheel to another rotating machine element it is conventional to utilize an articulated rod, which is jointed to and positioned between the driving wheel and the other machine element, said articulated rod being asymmetrically jointed to the driving wheel and the machine element.

Such an articulated rod, however, does not constitute a satisfactory solution to the power transmission, since twice during a revolution of the driving wheel, at k° and (k+180)°, it is unable to take up tangential forces from the driving wheel, so that the rigidity of the whole transmission approaches zero on these occasions.

Furthermore, if said machine element is applied in a joint in order to transmit a torque to a similar machine element also applied in the joint, to which an articulated rod is arranged for further transmission, such a joint demands a considerable amount of space and numerous constructional parts such as shafts and bearings.

It is also difficult undecimatedly to transmit the torque which is obtained from said driving wheel as this requires further constructional parts.

SUMMARY OF THE INVENTION

With a device according to the present invention, the disadvantages described above are eliminated and the arrangement is characterised by providing a connection between two shafts by means of discs carried by the shafts, each disc having two projections therefrom spaced from and angularly spaced around the shaft axis, and extending different distances from the disc, the ends of the projections being connected by parallel rods which are articulated at their ends to the ends of the projections.

By transmitting power by means of two parallel articulated rods, the joints of which are displaced preferably 90° with respect to each other on a common disc, a sufficiently great tangential force component is continuously obtained for the common disc to be turned irrespective of the position of the articulated rods.

However, the displacement can be allowed to vary within an interval of 60° - 120° without substantially decreasing the efficiency.

By clamping two common discs, between which a torque is transmitted, in a ball bearing so that they form a shaft for a ball bearing, a very compact construction requiring only a small space is obtained which also includes a very small number of parts.

Because the shaft in the support of one of the articulated rods is directed against the shaft in the other end, the articulated rod can be freely turned without the turning being prevented by the shafts. By means of a device with two parallel articulated rods according to the invention, a torsional angle of almost 360° can be obtained by such an arrangement.

BRIEF DESCRIPTION OF THE DRAWINGS

The device according to the invention will be described more fully with reference to the accompanying drawings, in which.

DESCRIPTION OF THE PREFERRED EMBODIMENTS

Figure 1:
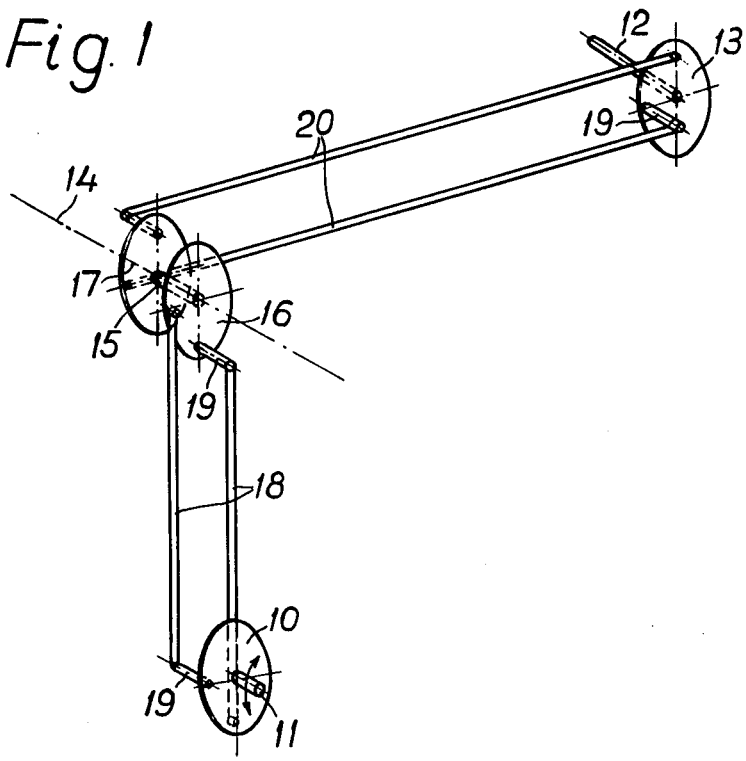
FIG. 1 shows the principle of a device according to the invention.

FIG. 1 shows the principle of a system of transmitting power, in which a common disc 10 is connected to a driving unit (not shown) by way of a shaft 11. The function of the system is to transmit the torque of the shaft 11 to the shaft 12 of a disc 13 through a joint 14. In the joint 14 there are arranged two discs 16 and 17 on a common shaft 15. Between the disc 10 and the disc 16 there are arranged two parallel articulated rods 18 which are pivoted to the discs 10 and 16 by means of shafts 19 arranged perpendicular to the articulated rods 18. Between the disc 17 and the disc 13 there are arranged two further parallel articulated rods 20 which are pivoted to the discs 17 and 13 by means of shafts 19 arranged perpendicular to the articulated rods 20.

Figure 2:
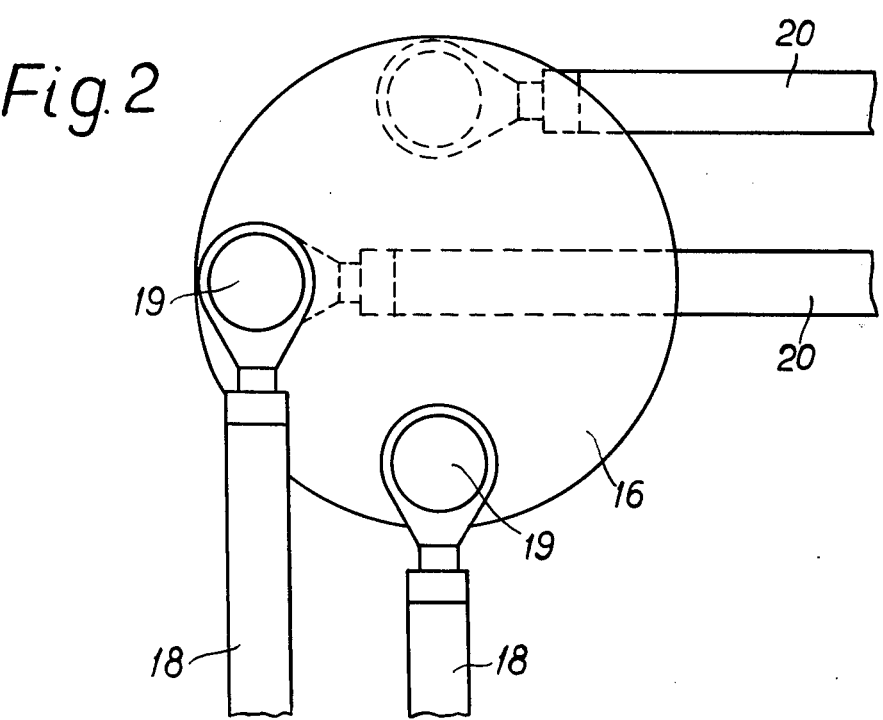
FIG. 2 shows the application of the articulated rods, included in the device according to the invention, to a common disc.

The shafts 19 are arranged to subtend at an angle of 90° with each other on each disc 10, 16, 17 and 13, which is clear from FIG. 2 showing the joint 14 in more detail.

A torque applied to the shaft 11 by means of a driving unit is transmitted by way of the disc 10 and the articulated rods 18 to the disc 16. By way of shaft 15 the torque is transmitted to the disc 17 which, by the articulated rods 20 and the disc 13, transmits the torque to the shaft 12.

Figure 3:
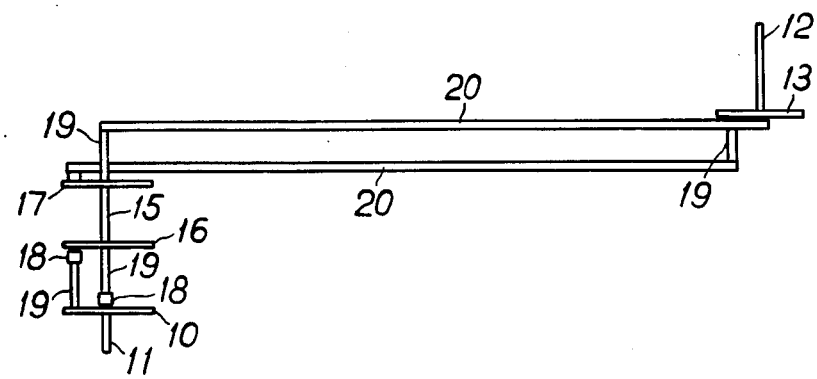
FIG. 3 shows the device according to FIG. 1 in a view from above.

By transmitting a torque in the joint 14 from a system of articulated rods 18,19 on one side of the discs 16 and 17 to a system of articulated rods on the other side of the discs, as is clear from FIG. 3 showing the construction of FIG. 1 from above, the entire torque applied to the shaft 14 is transmitted to the shaft 12.

The range of rotation which can be obtained in this way is very close to 360°, as the shafts 19 are of different lengths for each individual articulated rod in each parallel pair 18,20 of such rods, so one of the articulated rods can be allowed to pass below the other until it runs against the shaft of the articulated rod lying above it.

The principle of articulated rods shown is especially adapted to manipulators which often consist of a plurality of units jointed to each other, between which a torque has to be transmitted, and particularly in the cases where driving units for the gripping tools of a manipulator are applied to the frame of the manipulator, thus reducing the weight of the movable parts of the manipulator.

Figure 4:
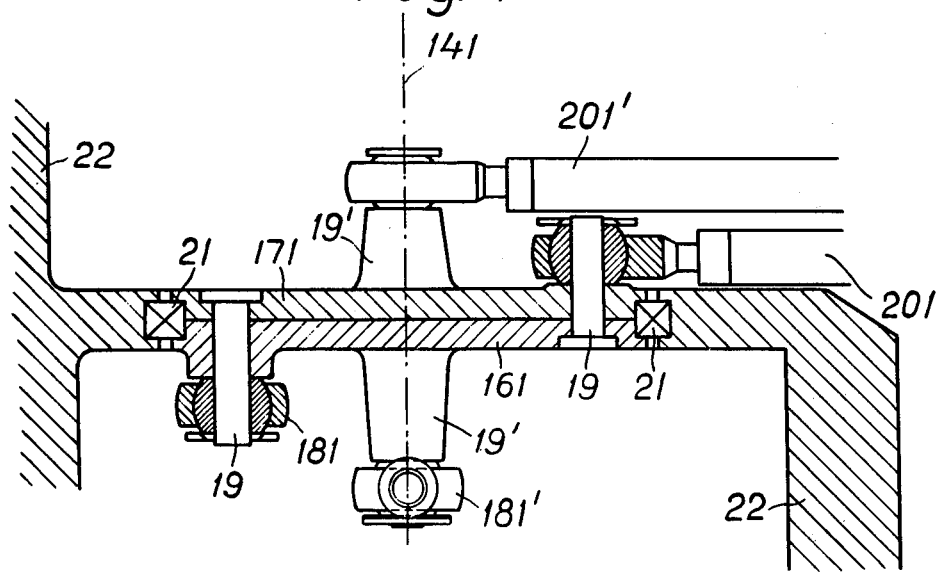
FIG. 4 shows how two common discs according to the invention are clamped in a ball bearing.

Since, as is clear from FIG. 3, the space-requirement in the joint 14 is great, as its width is determined by the total width of the units 19-16-15-17-19, the discs 16 and 17 can be arranged as shown in FIG. 4, in which two discs 161 and 171 are arranged in contact with each other without an intermediate shaft 15 and at the same time are held in a ball bearing 21, thus jointly acting as a shaft for the inner ring of the ball bearing. The outer ring of the ball bearing 21 is suitably fixed in a frame 22.

The ball bearing 21 is peferably in the form of a ball bearing with shoulders, thus making it possible to take up the torque and securing an accurate operation.

The shafts 19 here pass through both discs 161 and 171, in this way securing a better control. In the event the shafts 19 are arranged opposite to each other, it is suitable to replace them with one single shaft 19' which passes through both discs 161 and 171 and is common to the articulated rods 181' and 201', thus obtaining a rigid construction which takes up torques from the articulated rods while at the same time it requires minimum space.

As is clear from FIG. 3, the transmission system shown there must be extended in lateral direction when further joints are added, in order that the torque originally applied to the shaft 11 may be transmitted undiminished and therefore such a transmission system will require considerable space.

Figure 5:
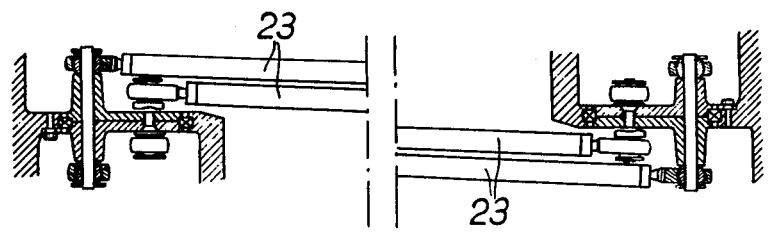
FIG. 5 shows an embodiment of the device according to the invention where the articulated rods are obliquely positioned in relation to the arrangement of FIG. 3.

By inclining each parallel pair of articulated rods 23, as shown in FIG. 5, the "inner" pair of articulated rods thus starting as the "outer" pair of articulated rods having the same width as the preceding pair of articulated rods, a transmission system according to FIGS. 1 and 3 can be enlarged by an arbitrary number of joints without increasing the width.

The device according to the invention is of course not limited to the embodiments shown but can be varied in many ways within the scope of the following claims.

I claim:

1. Means for mechanically transmitting a torque from a driving shaft to a parallel driven shaft at a distance from the driving shaft comprising a first link plate connected to the driving shaft, a second link plate connected to the driven shaft, a first pair of parallel shafts of different lengths extending axially in the same direction from each of said first and second link plates and angularly spaced about the axis thereof, and a first pair of articulated rods, each of said articulated rods at one end being pivotly connected to a longer shaft of one link plate and at the other end to a shorter shaft of the other link plate, said articulated rods being longer than the radius of the radial extension of the link plates.

2. Means for mechanically transmitting a torque according to claim 1 further including a third link plate connected to a driven shaft parallel to the driving shaft, a pair of parallel shafts of different lengths extending axially in the same direction from said third link plate, a second pair of parallel shafts of different lengths extending axially in the same direction from said second link plate in a direction opposite from the first pair of parallel shafts of the second link plate, and a second pair of articulated rods where each rod of said second pair of articulated rods is pivotly connected at one end to one of the shafts of the third link plate and at the other end to a shaft of the second pair of shafts from the second link plate and where each rod of said second pair articulated rods is connected to a shorter shaft at one end and to a longer shaft at the other end, said second pair of articulated rods being longer than the radius of the radial extension of the link plates.

3. Means for mechanically transmitting torque according to claim 2 wherein said link plate comprises discs arranged within the inner ring of a roller bearing and secured to each other.

4. Means for mechanically transmitting torque according to claim 3 wherein said first pair of parallel shafts projects from one of the discs and said second pair of parallel shafts projects from another disc.

5. Means for transmitting torque according to claim 4 wherein one shaft of said first pair of parallel shafts of the second link plate is coaxial with one shaft of said second pair of parallel shafts of the second link plate.

6. Means for transmitting torque according to claim 5 wherein the other shaft of said first pair of parallel shaft of the second link plate is substantially diametrically opposed to the other shaft of said second pair of paralled shafts of the second link plate.

7. Means for transmitting a torque according to claim 1 wherein the angular spacing of the pair of parallel shafts about the axis of the link plates is from about 60° to about 120°.

8. Means for transmitting a torque according to claim 7 wherein the angular spacing of the parallel shafts about the axis of the link plates is about 90°.

9. Means for transmitting a torque according to claim 2 wherein said first and second link plates each have first and second opposite sides and the first pair of parallel shafts project from the first side of the first link plate and the second side of the second link plate.

10. Means for transmitting a torque according to claim 9 wherein said first and second link plates are in a common plane and said articulated rods forming an angle to said common plane.

11. Means for mechanically transmitting a torque from a driving shaft to a parallel driven shaft at a distance from the driving shaft comprising a first link plate connected to the driving shaft, a second link plate connected to the driven shaft, an intermediate plate member in a parallel plane with said link plates, a pair of parallel shafts of different lengths extending axially in the same direction from each of said link plates and angularly spaced about the axis thereof, pairs of parallel shafts of different lengths extending axially from each side of said intermediate member and angularly spaced about the axis thereof, and pairs of articulated rods connecting the parallel shafts of each link plate with the parallel shafts of a side of said intermediate member, each of said articulated rods at one end being pivotly connected to a shorter shaft and at the other end to a longer shaft, said articulated rods being longer than the radius of the radial extension of the link plates or the intermediate plate member.

* * * * *